United States Patent [19]

Burger et al.

[11] Patent Number: 4,685,836

[45] Date of Patent: Aug. 11, 1987

[54] METHOD OF CONSOLIDATING A GEOLOGICAL FORMATION BY THERMAL POLYMERIZATION

[75] Inventors: Jacques Burger, Bougival; Claude Gadelle, Rueil Malmaison; Jacques Salle de Chou, Paris, all of France

[73] Assignee: Institut Francais du Petrole, Reuil-Malmaison, France

[21] Appl. No.: 814,754

[22] Filed: Dec. 30, 1985

[30] Foreign Application Priority Data

Dec. 28, 1984 [FR] France ............................ 84 19961

[51] Int. Cl.$^4$ .............................................. E02D 3/12
[52] U.S. Cl. .................................. 405/264; 166/288; 166/294; 405/263
[58] Field of Search ............... 166/288, 291, 294, 295; 405/264, 263

[56] References Cited

U.S. PATENT DOCUMENTS

| | | | |
|---|---|---|---|
| 3,330,350 | 7/1967 | Maly | 166/288 |
| 3,812,913 | 5/1974 | Hardy et al. | 166/288 |
| 3,910,351 | 10/1975 | Wu et al. | 166/288 X |
| 3,951,210 | 4/1976 | Wu et al. | 166/288 |
| 3,974,877 | 8/1976 | Redford | 166/288 X |
| 4,370,078 | 1/1983 | Gadelle et al. | 166/288 X |
| 4,494,605 | 1/1985 | Wiechel et al. | 166/288 |

*Primary Examiner*—Dennis L. Taylor
*Attorney, Agent, or Firm*—Antonelli, Terry & Wands

[57] ABSTRACT

A method is provided for consolidating a geological formation comprising the injection of a liquid organic mixture into the formation then injection of a hot inert gas mixture through said liquid mixture, so as to transform this liquid mixture by a thermal polymerization reaction into a substance binding the non consolidated elements of the formation. The injected liquid organic mixture contains at least one polyethylenic hydrocarbon to which a catalyst may be added.

17 Claims, 1 Drawing Figure

U.S. Patent  Aug. 11, 1987  4,685,836
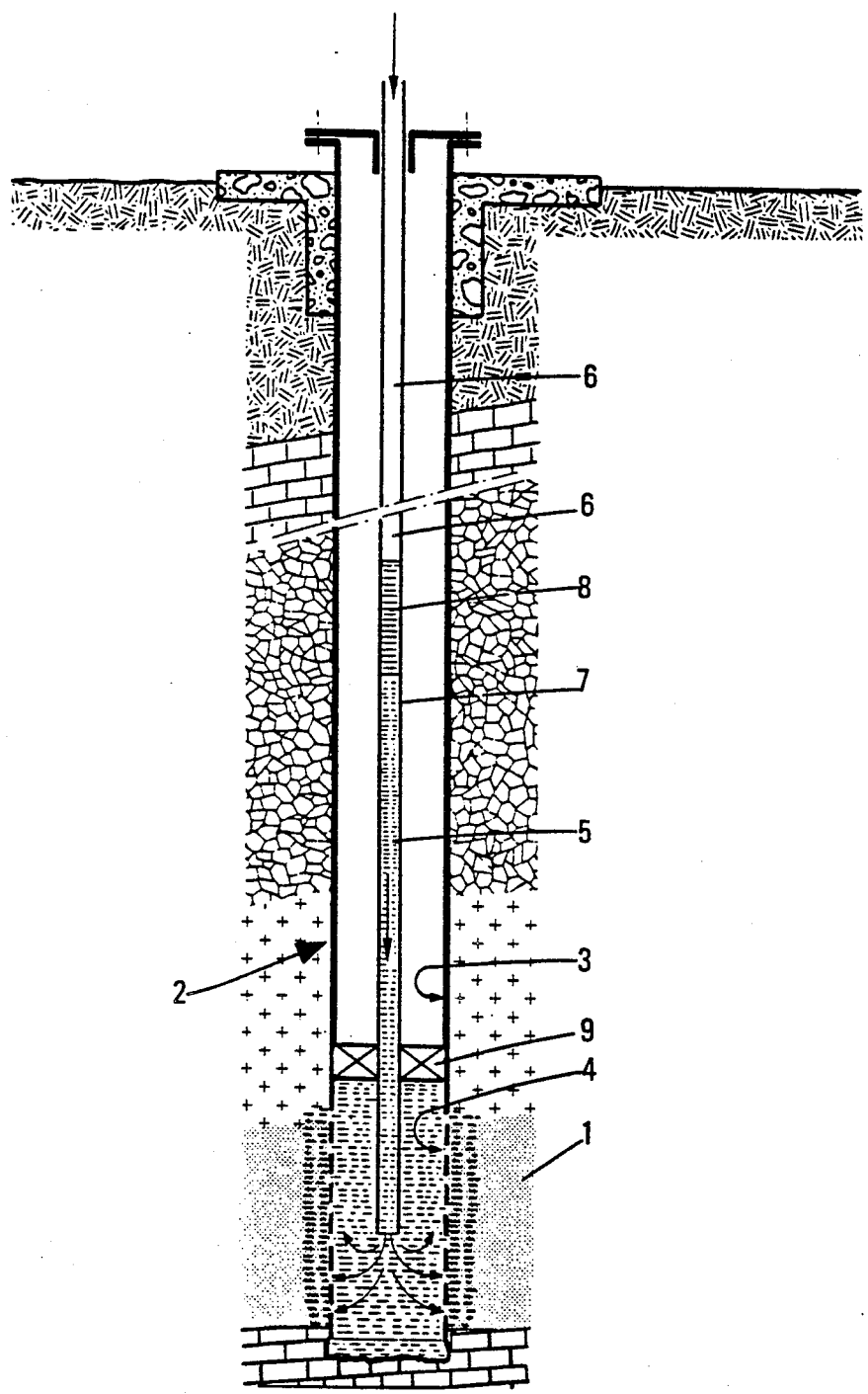

METHOD OF CONSOLIDATING A GEOLOGICAL FORMATION BY THERMAL POLYMERIZATION

BACKGROUND OF THE INVENTION

1. Field of the Invention

The present invention relates to a method of consolidating geological formations, this method being more particularly applicable to reservoirs containing oil or gas for eliminating the infiltration of sand into the wells passing through sandy formations which are little or not at all consolidated. Generally, this method may be used for locally consolidating permeable formations.

2. Description of the Prior Art

Different methods have already been proposed for preventing the infiltration of sand into new wells, or for treating wells giving rise to sand infiltration during working of the oil or gas deposits.

A first type of method consists in retaining the sand by mechanical means, using artificial screens with calibrated orifices, or piles of gravel having a well defined granulometric distribution, depending on the dimension of the grains of sand of the geological formation through which the well passes. Such a method, delicate to implement, is often used for equipping new wells.

A second type of method consists in injecting into the geological formation a liquid resin which, by polymerizing, creates a bond between the grains of sand. The efficiency of a chemical method of this second type is uncertain, for the polymerization reaction of the resin injected depends essentially on the conditions reigning in the well at the level of the formation and on the characteristics of this formation. Such a method therefore does not allow the degree of advance of a chemical reaction to be controlled. The result is the risk either of insufficient consolidation of the formation, if the degree of polymerization of the resin is too low, or too great a reduction of the permeability or even complete clogging of the geological formation, if too much polymer is retained in certain pores.

To overcome this problem, the French patent No. 2 474 558 describes a method in which the polymerization reaction takes place between a liquid chemical agent containing appropriate catalysts placed about the well to be treated and an injected oxidizing gas.

The flow of the gas after positioning the polymerizable agent ensures that permeability is maintained. The liquid organic mixture contains a polyethylene compound and a catalyst such that the oxidizing polymerization reactions lead to the consolidation of the medium without it being necessary to preheat the formation.

However, this method requires the use of an oxygen-inert gas mixture whose availability is not always evident. In addition, the amount of oxidizing gas must be limited so that, following release of the heat by the oxidization reaction, the temperature does not reach values higher than 350° C., at which the polymerized product would be degraded by combustion.

SUMMARY OF THE INVENTION

The object of the present invention is therefore to provide a method more flexible in use and readily controllable for consolidating a geological formation, without appreciably reducing its permeability. This method, applicable to formations whose characteristics may vary over a fairly wide range, is particularly well suited to the treatment of oil or gas wells giving rise to sand infiltration.

This result is reached in accordance with the invention, with a method providing the thermal alteration of a polymerizable substance. This method comprises injecting into the formation a liquid organic mixture followed by injection through this liquid mixture of a hot and chemically inert gas mixture so as to transform said liquid mixture by a thermal polymerization reaction into a substance binding the non consolidated elements of the formation. The term chemically inert gas mixture as used herein means a gas mixture which, under the operating conditions of the process, does not react with the fluids of the deposit or with the injected fluids. The injected gas may however possibly contain oxygen by way of traces.

The method of the invention is distinguished from the teaching of the patent GB-No. 2 068 042, more particularly by the use of an inert gas mixture. It is also distinguished from the French patent No. 1 409 599 which relates to a method of consolidating ground for making the ground impermeable, whereas the present method preserves the permeability of the formations.

The hot gas mixture plays the role of a heat carrying fluid for increasing the temperature of the geological layer in the immediate vicinity of the well up to a heat level required for polymerizing the polyethylene hydrocarbons of the liquid organic mixture. The gas will be injected into the formation at a temperature preferably between 150° and 325° C. Injection of the gas mixture prevents an appreciable reduction of the permeability of the formation to fluids such as oil or natural gas. The composition of a liquid organic mixture, as well as the temperature and the amount of hot gas are adjusted so that the degree of advance of polymerization of the liquid mixture is sufficient.

In other words, the invention provides a method for consolidating a geological formation without appreciably reducing its permeability, by alteration of a polymerizable substance, this method comprising the injection of a liquid organic mixture into the formation, then the injection of a chemically inert gas mixture through said liquid mixture and being characterized in that said liquid organic mixture contains at least one polyethylene hydrocarbon to which catalysts have possibly been added and in that said chemically inert gas mixture is heated so as to raise the temperature of the formation to a value such that the liquid mixture is transformed by a thermal polymerization reaction into a substance binding the unconsolidated elements of the formation.

More particularly, the invention provides a method of consolidating the geological formation comprising the two following successive steps:

(a) a liquid organic mixture containing at least one polymerizable chemical compound and possibly a catalyst is injected into the formation, said mixture being capable of undergoing in situ, in contact with the hot gas, reactions leading to the formation of a solid product which consolidates this formation, without appreciably affecting its permeability, and (b) a chemically inert gas is injected in a sufficient amount to obtain substantially complete solidification of said liquid organic mixture.

The liquid organic mixture used in the method of the invention contains at least one polyethylenic hydrocarbon to which catalysts may possibly be added. The hydrocarbons of the organic mixture used in the method of the invention may advantageously contain one or more polyethylenic hydrocarbons obtained by polymerization of dienes or trienes, possibly diluted with an organic solvent. The polethylenic hydrocarbon used will be advantageously polybutadiene. The solvents used will be formed, for example, by hydrocarbons such as benzene, toluene, xylene, or by an oil fraction; the solvent content will be advantageously between 0 and 50% for limiting the reduction of reactivity due to the dilution.

The catalyst, added if required to the polyethylenic compound, may be at least one element from the group formed by barium, zirconium, cerium, lanthanum, the lanthanides, (i.e. the lanthanide series) vanadium, manganese, iron, cobalt, zinc, nickel, lead and copper. The elements of such a catalyst will be used in the form of salts, such as carboxylates, naphtenates, sulfonates, octoates ..., soluble in the basic constituents of the organic mixture. The proportion of each of the metals used in the catalyst in the solution will be less than 3% by weight and preferably between 0.007 and 2% by weight The exact composition of the catalyst (metals used and the metal contents) will depend on the nature of the surroundings and on the conditions of the deposit (pressure, temperature ... ).

The catalyst may also contain an organic compound such as a peroxide or any other compound allowing the formation of free radicals. To these peroxide compounds may possibly be added catalysts chosen from the above defined group, formed by barium, zirconium, cerium, lanthanum, and lanthanides, vanadium, manganese, iron, cobalt, zinc, nickel, lead, copper. Among the peroxide compounds may be mentioned by way of example t-butyl hydroperoxide, di-t-butyl peroxide, cumene hydroperoxide ...

The amount of organic mixture injected will preferably be less than 500 liters per meter of thickness of the geological formation; greater amounts however do not affect the efficiency of the method of the invention.

In the application of the method to gas reservoirs, the chemically inert gas injected, such as defined above, will advantageously be natural gas.

In the application of the method to oil reservoirs, the gas injected will advantageously be wet steam produced by a surface steam generator of a model currently used for the thermostimulation of reservoirs. The gas injected may also be formed by a mixture of steam and burnt gases produced by a generator placed at the bottom of the well or by any other combination of steam and inert gas. The use of any other method of producing hot gases, such as the use of a gas burner or heating resistances, comes within the scope of the invention.

The inert gas flow rate will be such that the gas to be injected invades the height to be treated. The duration of injecting the inert hot gas will preferably be less than 48 hours; longer times however do not effect the efficiency of the method of the invention. The heating time must be sufficient for the heat level to be reached allowing said organic mixture to polymerize efficiently and ensuring cohesion between the grains of the formation.

In the accompanying FIG. 1, illustrating schematically one example of implementing the invention, reference 1 designates a sandy geological formation through which a well 2 passes, which comprises a casing 3 with perforations 4 at the level of the formation 1 from which it is desired to extract a fluid, such as oil or natural gas. In this embodiment, the method of the invention is put into practice by successively injecting into the formation 1 to be treated predetermined amount of the liquid organic mixture 5, such as a polybutadiene to which is possibly added a catalyst such as defined above, possibly mixed with another organic liquid such as a solvent or a petroleum fraction, and an inert gas 6, such as steam diluted if required in accordance with the above indications.

The liquid organic mixture and the gas may be injected one after the other through the same production stringer or tubing 7 opening, at its lower part, substantially at the level of the perforations 4.

A device 9, of the packer type, will provide sealing by closing the annular space between the casing 3 and the production stringer 7, above the formation 1. In the production stringer 7, the hot inert gas is separated from the liquid organic mixture by plug 8 of a non polymerizable substance, this plug being formed for example by a small volume of solvent or a petroleum fraction, in an oil well, or cold natural gas in a gas well. Thus reactions of the organic mixture occurring within the production stringer are avoided.

Of course, the embodiment described above is in no wise limitative, other embodiments being possible.

Generally, the liquid injected at 5 is an organic mixture capable of being transformed, under the action of the heat, into a polymerisate leading to consolidation of said formation in the immediate vicinity of the well.

In the case of oil deposits, the injection of liquid 5 may be advantageously preceded by the injection of fluids such as xylene or petroleum fraction and an alcohol, such as isopropanol, so as to drive out the oil and the water present in the immediate vicinity of the well which, if they are in excessive amounts, may have a harmful effect on the efficiency of consolidation of the surroundings.

The amount of gas injected will be determined so as to obtain complete solidification of the organic liquid 5.

The efficiency of the method of the invention is illustrated by the following tests, the characteristics of carrying out these tests having no limitative character.

TEST No. 1

An intimate mixture of quarry sand (grain size between 150 and 300 microns), kaolinite and polybutadiene was packed at ambient temperature into a vertical thin wall tube 12.5 cm in diameter, over a height of 15 cm. Heating collars were placed about the tube over the height occupied by the mixture, so as to be able to check the transverse thermal leak.

The solid mass, obtained by packing a mixture of 8 parts of sand, 2 parts of kaolinite and a part of polybutadiene had a porosity of 37% and a polyenic compound saturation equal to about 50% of the volume of the pores. Its initial temperature was 50° C.

A flow of nitrogen, equal to 3 liters/min, was injected at atmospheric pressure through the upper face of the tube for 7 hours. At the end of the tests, it was observed that the solid mass was not consolidated.

It is then apparent that, under the chosen operating conditions, no reaction occurs in a solid mass impregnated with polybutadiene.

TEST No. 2

A test was carried out using a mixture formed of 10% polybutadiene, 85% quarry sand and 5% kaolinite.

The experiment was carried out at a temperature of 250° C. at a relative pressure of 10 bars, with a nitrogen (15% volume) and steam (85% volume) flow equal to 3 liters per minute for 7 hours. After the test, it was found that the mass was well consolidated; its resistance to compression was 33 bars.

TEST No. 3

A test was carried out with a solid mass identical to that of test No. 2, at a temperature of 300° C. and at a pressure of 10 bars. Injection of a gas mixture containing 15% nitrogen and 85% steam lasted 7.5 hours at a flow of 3 liters/min.

Resistance to compression of the medium obtained after testing was 65 bars.

TEST No. 4

In a solid mass formed of 95% quarry sand and 5% kaolinite, crude oil was injected (density equal to 0.87) so as to saturate the free pore volume. After displacement of this fluid by means of a gasoline plug, an organic mixture was injected formed of 72% polybutadiene, 20% gasolene, 5% cobalt octoate and 3% zirconium octoate. The cell was heated to 210° C. at 10 bars and nitrogen was injected at a flow rate of 3 liters/min for 80 hours. After testing, the mass kept its permeability and was well consolidated; its resistance to compression was between 90 and 130 bars depending on the samples.

TEST No. 5

In a solid mass identical to the one formed during Test No. 4, an organic liquid was positioned formed of polybutadiene diluted by 20% by weight of gasolene and to which 0.3% by weight of cerium was added. The cell was heated for 25 hours at a temperature of 240° C. and at a pressure of 10 bars; nitrogen was injected at a flow rate of 3 liters/min. After testing, the mass was well consolidated; its resistance to compression was 135 bars.

TEST No. 6

A solid mass formed of 95% by weight of sand and 5% by weight of clay was impregnated with an organic liquid formed of polybutadiene (78% by weight), gasolene, (20% by weight) and di-t-butyl peroxide (2%). After the mass was placed in a cell, nitrogen was injected at a pressure of 10 bars and a flow rate of 3 liters/min at 200° C. for 53 hours. After testing, samples were taken from the consolidated mass; resistance to compression was 22 bars.

What is claimed is:

1. A method of consolidating a geological formation without appreciably reducing its permeability by alteration of a polymerizable substance, said method comprising the injection of a liquid organic mixture into the formation, then injection of a hot and chemically inert gas mixture through said liquid mixture, wherein said liquid organic mixture contains at least one polyethylenic hydrocarbon to which catalysts may be added and said chemically inert gas mixture is heated so as to raise the temperature of the formation to a value such that the liquid mixture is transformed by a thermal polymerization reaction into a substance binding non-consolidated elements of the formation.

2. The method as claimed in claim 1, wherein said injected organic mixture contains at least one polyethylenic hydrocarbon obtained by polymerization of dienes or trienes.

3. The method as claimed in claim 1, wherein said injected organic mixture contains polybutadiene.

4. The method as claimed in any of the preceding claims, wherein said polyethylenic hydrocarbon is diluted with a solvent.

5. The method as claimed in claim 1, characterized in that said polyethylenic hydrocarbon has added thereto a catalyst containing at least one element selected from the group consisting of barium, zirconium, cerium, lanthanum, lanthanides, vanadium, manganese, iron, cobalt, zinc, nickel, lead and copper.

6. The method as claimed in claim 5, wherein said element of the catalyst is used in the form of salts, including carboxylates, naphtenates, sulfonates or octoates, soluble in said organic mixture.

7. The method as claimed in claim 1, wherein said polyethylenic hydrocarbon has added thereto a compound, for the formation of free radicals.

8. The method as claimed in claim 1, wherein said injected hot gas mixture is natural gas.

9. The method as claimed in claim 1, wherein said injected hot gas mixture is wet steam.

10. The method as claimed in claim 1, wherein said injected hot gas mixture is a mixture of steam and burnt gases.

11. The method as claimed in claim 1, wherein said polyethylenic hydrocarbon has added thereto a peroxide compound for the formation of free radicals.

12. The method as claimed in claim 1, wherein said polyethylenic hydrocarbon is diluted with a solvent and said injected hot gas mixture is natural gas.

13. The method as claimed in claim 1, wherein said polyethylenic hydrocarbon is diluted with a solvent and said injected hot gas mixture is wet steam.

14. The method as claimed in claim 1, wherein said polyethylenic hydrocarbon is diluted with a solvent and said injected hot gas mixture is a mixture of steam and burnt gases.

15. The method as claimed in claim 1, wherein said geological formation contains oil or natural gas and the liquid organic mixture and the chemically inert gas mixture are, successfully, introduced into the formation via a well leading to said formation.

16. The method as claimed in claim 15, wherein said chemically inert gas mixture is heated to temperatures ranging from 150° to 325° C.

17. The method as claimed in claim 16, wherein said inert gas mixture is natural gas.

* * * * *